April 18, 1933.  A. R. KOOS  1,904,143
GAUGE DEVICE
Filed Feb. 8, 1930
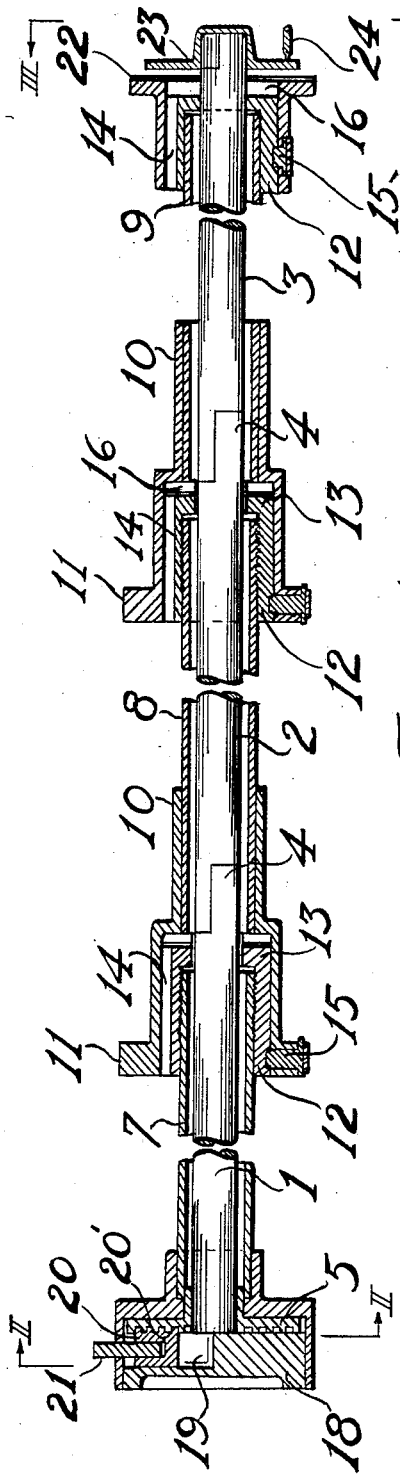
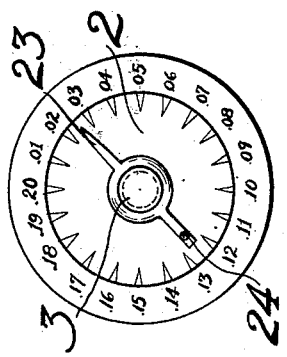
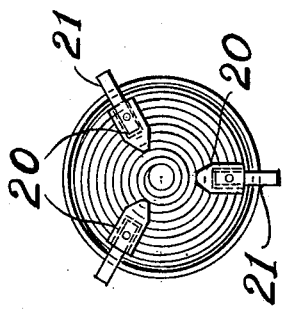
INVENTOR
Arendt R. Koos
BY
W. E. Currie
ATTORNEY Patented Apr. 18, 1933

1,904,143

UNITED STATES PATENT OFFICE

ARENDT R. KOOS, OF ELIZABETH, NEW JERSEY

GAUGE DEVICE

Application filed February 8, 1930. Serial No. 426,911.

This invention relates to improvements in gauges and has for an object to provide an improved gauge device for measuring the inside diameter of any cylindrical bore. The invention will be fully understood from the following description illustrated by the accompanying drawing, in which Fig. 1 is a longitudinal sectional view of the gauge device;

Fig. 2 is a plan view of the spiral threads showing the gauge pins; and

Fig. 3 is an end elevation of the gauge device showing the dial and indicator.

In the drawing, reference numerals 1, 2 and 3 designate sections of a shaft which are disposed in abutting relation and are prevented from relative rotation by the offset end portions 4. The sections of shaft are fastened together by set screws or the like (not shown) to prevent relative axial or radial movement. The shaft is provided with an enlarged end or head 5 having spiral threads on the face thereof.

The shaft is adapted to be rotated in a sectional housing or tubular member. The housing comprises tubing sections 7, 8 and 9. Adjoining sections are connected together by a sleeve having a portion 10 affixed to one section and having an enlarged portion 11 overlapping the adjoining section in spaced relation thereto. A collar 12 is disposed between the enlarged portion 11 of the sleeve and the tubing section. A shoulder 13 on collar 12 constitutes a bearing for the shaft. The collar is prevented from rotation with respect to enlarged portion 11 by means of a key 14 and their relative position axially is maintained by means of set screw 15. A washer 16 is disposed between the shoulder 13 and the sleeve.

The housing is provided with an end cover 18 which is inserted into the housing. The end cover is provided with radially extending ways 19 facing the threaded face of the shaft head. Gauge pins each comprising a base 20 and a pin 21 are slidable in the ways. Base 20 is provided with one or more ridges or threads 20' which engage the threads of the head of the shaft.

The handle end of the housing is enclosed by a sleeve identical with that previously described and provided with the cooperating collar 12, key 14, set screw 15 and washer 16 previously described. The end face is covered by a dial 22. The shaft carries a pointer 23 which in turn bears a handle 24. By rotating the shaft the gauge pins are fed out or are withdrawn and their position is registered by the pointer upon the dial.

The device is easily operated and its parts are so enclosed as to prevent the movable parts from coming out of adjustment. It is particularly adapted for measuring the internal diameter of elongated tubes. In the gauging of cracking coil tubes, for example, the device has given excellent service, due to its accuracy and ease of handling. The sections of shaft and housing being readily detachable, the handle can be readily shortened or lengthened by removing or adding, respectively, sections of the shaft and housing and the device thereby rendered serviceable for measuring the internal diameter of short or long tubes.

Various changes may be made within the scope of the appended claims in which it is desired to claim all novelty inherent in the invention as broadly as the prior art permits.

I claim:

1. A gauge device for measuring inside diameters, comprising a shaft, an indicator at one end thereof, a tubular member rotatably receiving the shaft, one end of said member having a dial cooperating with the indicator, the opposite end of the shaft being provided with an enlarged face carrying spiral threads, the opposite end of the tubular member enclosing the enlarged face and provided with radial ways facing the threads, and gauge pins slidable in the ways and engaging the threads.

2. A gauge device for measuring inside diameters, comprising a sectional shaft, an indicator at one end thereof, a sectional tubular member rotatably receiving the shaft and having at one end a dial cooperating with the indicator, the opposite end of the shaft being provided with an enlarged face carrying spiral threads, the opposite end of the tubular member enclosing the enlarged face and provided with radial ways facing the threads, and gauge pins slidable in the ways and each having an extended portion engaging with the threads.

3. A gauge device for measuring inside diameters, comprising a rotatable shaft, an enlarged face at one end thereof and carrying spiral threads, an expansible pin mechanism comprising a block having radial guide ways therein, pin-carrying members slidable in the guide ways and having extended threaded portions engaging with the threads on the face, and means for indicating the extent of movement of the pins when the shaft is rotated.

4. Apparatus according to claim 3, in which the shaft is constructed in sections to facilitate measurements in long tubes, and a sectional housing is provided around the shaft.

5. A gauge device for measuring the inside diameter of long tubes, comprising a shaft formed of readily detachable sections, a housing for said shaft formed of readily detachable tubular sections and in which the shaft is adapted to rotate, an enlarged face carrying spiral threads on the end of the shaft which is to be introduced into the tube to be gauged, a block carried by said housing and having radial guideways opposed to the face, pin-carrying members slidably mounted in the guideways and having threads engaging the threads on the face, an indicator on the exposed end of the shaft, a dial carried by the exposed end of the tubular housing over which the indicator is adapted to move, whereby a remote indication is obtained of the inside diameter of the tube at an extended distance from the point at which the reading is made.

ARENDT R. KOOS.